(12) United States Patent
Kumamoto

(10) Patent No.: US 7,933,006 B2
(45) Date of Patent: Apr. 26, 2011

(54) TILT INSPECTION APPARATUS AND METHOD OF INSPECTING TILT

(75) Inventor: Tooru Kumamoto, Kumamoto (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 29 days.

(21) Appl. No.: 12/588,038

(22) Filed: Oct. 1, 2009

(65) Prior Publication Data
US 2010/0020313 A1    Jan. 28, 2010

(30) Foreign Application Priority Data
Oct. 6, 2008   (JP) .................................. 2008-259951

(51) Int. Cl.
*G01B 11/26* (2006.01)
(52) U.S. Cl. ........................................................ 356/138
(58) Field of Classification Search .................. 356/138, 356/139.1
See application file for complete search history.

(56) References Cited

U.S. PATENT DOCUMENTS
5,018,853 A * 5/1991 Hechel et al. ................. 356/155

FOREIGN PATENT DOCUMENTS
JP         3-128407 A     5/1991
JP        11-291008 A    10/1999

* cited by examiner

*Primary Examiner* — Roy Punnoose
(74) *Attorney, Agent, or Firm* — McGinn Intellectual Property Law Group, PLLC

(57) ABSTRACT

A tilt inspection apparatus which detects tilt of an object to be observed with respect to a placement surface on which the object is placed, including: a light source which irradiates light or projects an image onto the object to be observed; a light shield plate which has a first slit extended in a first direction and a second slit extended in a second direction normal to the first direction, and is disposed between the light source and the object to be observed; and a carriage mechanism which supports the light shield plate so as to be rotatable in the in-plane direction of the light shield plate, and fixes the light shield plate while aligning the first slit normal to the placement surface is provided.

15 Claims, 15 Drawing Sheets

TILT INSPECTION APPARATUS AND METHOD OF INSPECTING TILT

This application is based on Japanese patent application No. 2008-259951 the content of which is incorporated hereinto by reference.

BACKGROUND

1. Technical Field

The present invention relates to a tilt inspection apparatus and a method of inspecting tilt.

2. Related Art

Confirmation of parallelism and verticality is important and indispensable for apparatuses assembled using a plurality of precisely-machined components, such as dies, for the purpose of maintenance and management of process accuracy. However, there have been no available methods of readily measuring parallelism and verticality of the individual components.

Japanese Laid-Open Patent Publication No. H03-128407 describes a device in which a plurality of slit beam planes are arranged so as to cause beam interception lines simultaneously on a plurality of planes of a rectangular parallelepiped object to be inspected, which are adjacent with each other while sharing a single apex, and so as to incline the angle of incidence with respect to the surface of the object to be inspected, to thereby enable simultaneous detection of defects occurred on a plurality of surfaces owned by a solid object.

Japanese Laid-Open Patent Publication No. H11-291008 describes a configuration in which a cross-shaped slit laser beam emitted from a laser oscillator is irradiated on a cast piece, which was cut from a continuously-cast piece by a gas cutting machine into a predetermined length, over the region from the end face to the lower surface. The end face and the lower surface of the cast piece irradiated by the cross-shaped slit laser beam are then photographed by a camera, an obtained image is processed, and geometries of the end face and the lower surface of the cast piece are detected based on a profile of the irradiated laser beam.

The methods of the above-described patent documents are, however, aimed at measuring surface profile of an object to be observed, while leaving a problem unsolved in terms of readily measuring tilt, relevant to parallelism and verticality, of the object to be observed.

SUMMARY

According to the present invention, there is provided a tilt inspection apparatus which detects tilt of an object to be observed with respect to a placement surface on which the object is placed, including:

a light source which irradiates light or projects an image onto the object to be observed;

a light shield plate which has a first slit extended in a first direction and a second slit extended in a second direction normal to the first direction, and is disposed between the light source and the object to be observed; and a carriage mechanism which supports the light shield plate so as to be rotatable in the in-plane direction of the light shield plate, and fixes the light shield plate while aligning the first slit normal to the placement surface.

According to the present invention, there is provided also a method of inspecting tilt of an object to be observed, using the above-described tilt inspection apparatus, by comparing a slit beam emitted from the light source and transmitted through the first slit or the second slit, with an edge of a predetermined surface composing the object to be observed.

According to the present invention, there is provided still also a method of inspecting tilt of an object to be observed with respect to a placement surface on which the object is placed, by disposing a light shield plate, which has a first slit extended in a first direction normal to the placement surface and a second slit extended in a second direction normal to the first direction, between the object to be observed and a light source; and by comparing a slit beam transmitted through the first slit or the second slit, with an edge of a predetermined surface composing the object to be observed.

By virtue of these configurations, tilt of each element of an apparatus assembled by a plurality of elements, with respect to the placement surface, may visually be observed and measured.

It is to be understood that also any arbitrary combinations of the above-described constituents, and also any exchanges in the expression of the present invention among the method, apparatuses and so forth are valid as embodiments of the present invention.

According to the present invention, tilt of the object to be observed with respect to the placement surface may readily be observed.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

Figure 1:
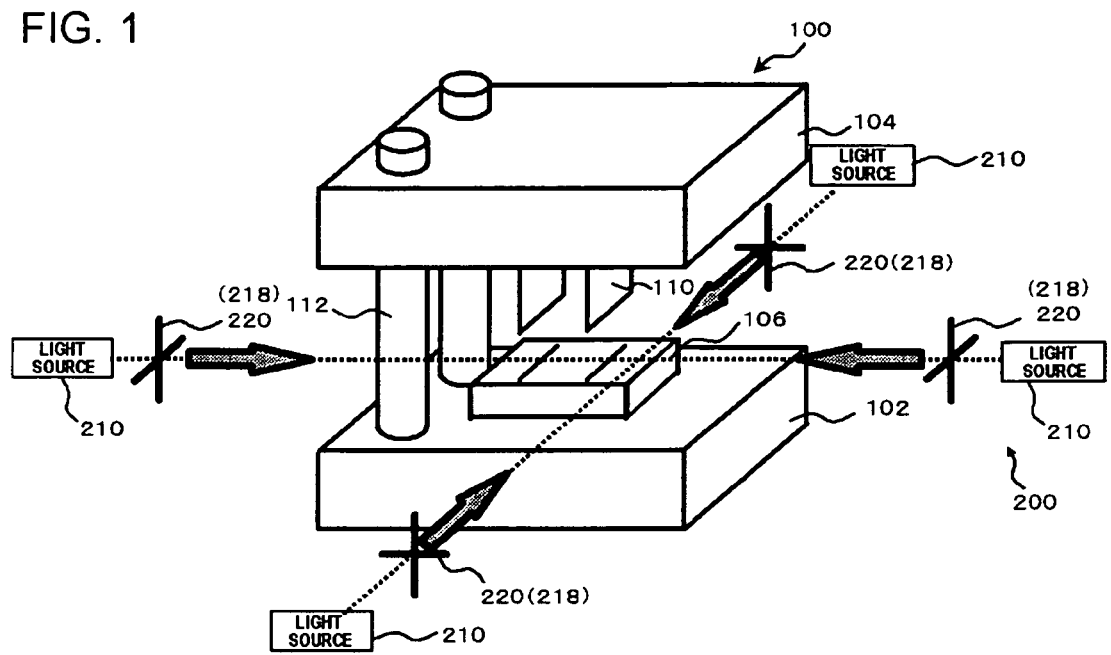
FIG. 1 is a schematic drawing illustrating procedures of detecting tilt of a cutting machine, as the object to be observed placed on a predetermined placement surface, with respect to the placement surface, in one embodiment of the present invention.

The invention will now be described herein with reference to an illustrative embodiment. Those skilled in the art will recognize that many alternative embodiments can be accomplished using the teachings of the present invention and that the invention is not limited to the embodiments illustrated for explanatory purposes.

Paragraphs below will explain embodiments of the present invention, referring to the attached drawings. Note that any similar constituents in all drawings will be given with similar reference numerals or symbols, and explanations therefor will not be repeated on occasions.

In the embodiments below, tilt of an object to be observed placed on a predetermined placement surface with respect to the placement surface is detected. The placement surface herein may be, for example, a substantially flat surface such as the top surface of a stage. The object to be observed may be, for example, an apparatus assembled using a plurality of precisely-machined components. Each component of the object to be observed may contain an edge necessarily extended in parallel with the placement surface (referred to as "parallel edge", hereinafter), or an edge necessarily extended normal to the placement surface (referred to as "vertical edge", hereinafter). When preciseness on the order of several to several tens micrometer is required for the object to be observed, the tilt of the object to be observed, with respect to the placement surface, may readily be observed and measured, using a method of inspecting tilt according to the embodiments described below.

Figure 12:
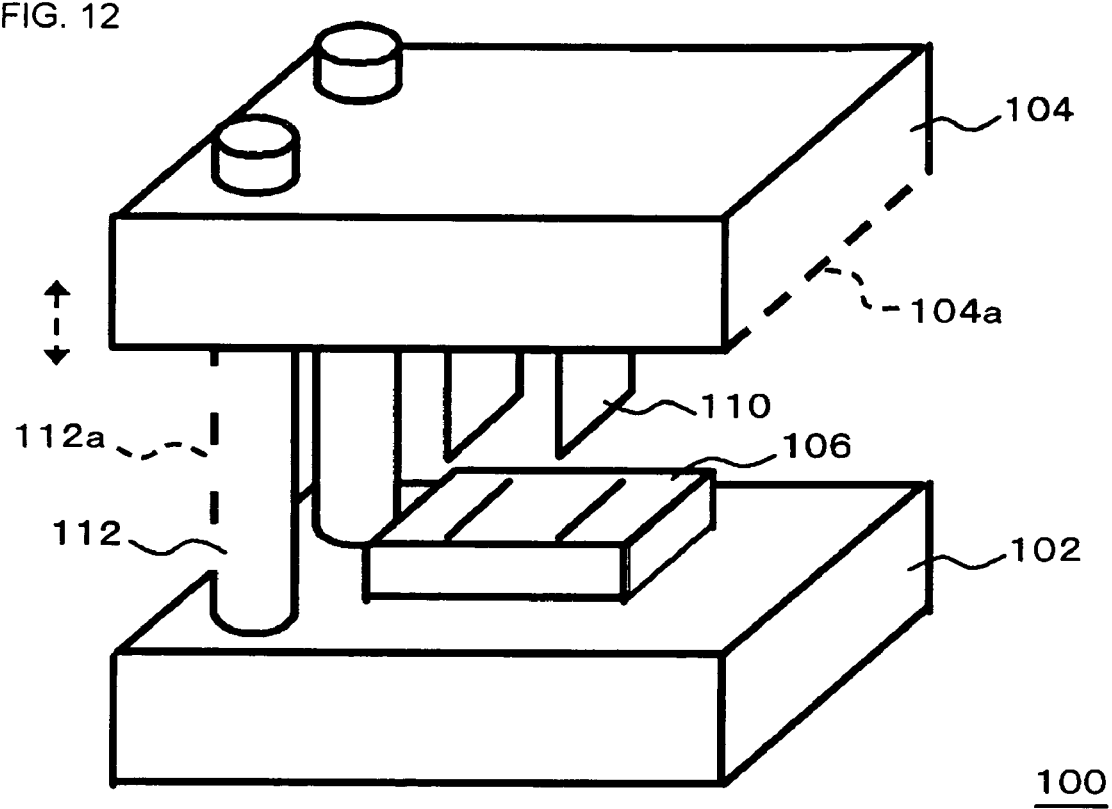
FIG. 12 is a perspective view illustrating an exemplary configuration of the cutting machine.

In the embodiments below, the object to be observed may be a cutting machine 100, for example. FIG. 12 illustrates an exemplary configuration of the cutting machine 100. The cutting machine 100 contains a lower die 102, an upper die 104, a die 106 attached to the lower die 102, a cutting punch 110 for cutting an object to be cut, attached to the upper die 104, and a support 112 holding the upper die 104 in a vertically movable manner. Each of the lower die 102, the upper die 104, the die 106, the cutting punch 110, and the support 112 is a die element, and the cutting machine 100 is assembled using these die components. Note that FIG. 12 illustrates only the bare minimum of elements necessary for explaining the embodiment of the present invention, while leaving any components necessary for ensuring and improving rigidity and strength of the dies unillustrated.

The cutting machine 100 may typically be a lead cutting die for cutting leads of a semiconductor device (not illustrated) which has a plurality of outer leads (simply referred to as "leads", hereinafter) along the periphery of an encapsulation resin having a semiconductor chip encapsulated therein.

The semiconductor device may be manufactured by the procedures below. First, the semiconductor chip is placed on a leadframe, and the semiconductor chip is encapsulated by a resin. The encapsulation resin is then deflashed, and the lead frame, if provided as externally unfinished, is subjected to external finishing such as plating. The semiconductor device is then cut off from the leadframe. If the semiconductor device is of surface mounting type, the cutting-off from the leadframe is followed by forming. More specifically, the outer leads horizontally projected are bent downwards, and then into the horizontal direction to thereby obtain a gull-wing geometry. This sort of cutting of lead may be conducted using a cutting machine 100 illustrated in FIG. 12, typically by placing a semiconductor device (not illustrated) on the die 106, and by vertically moving the upper die 104 along the support 112 assumed as an axis, with the aid of motive force of a press machine.

Figure 13A:
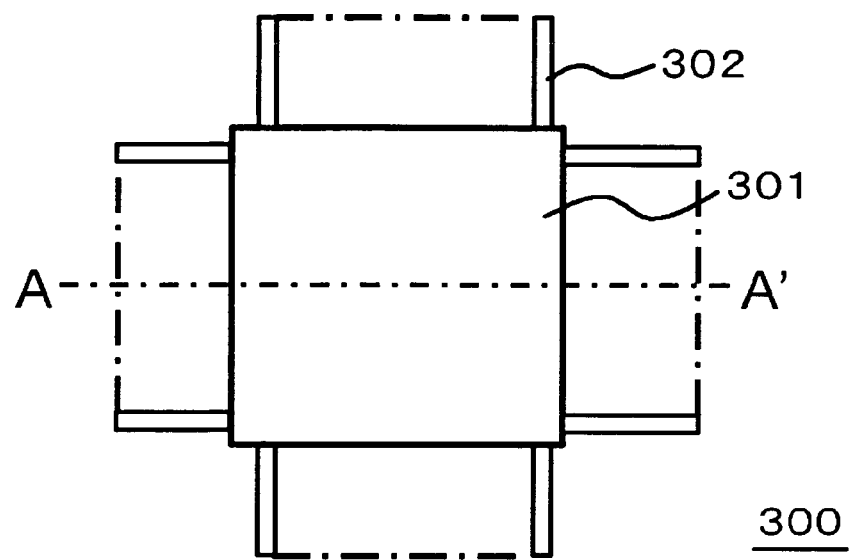
FIGS. 13A and 13B are drawings illustrating an exemplary semiconductor device.
Figure 13B:
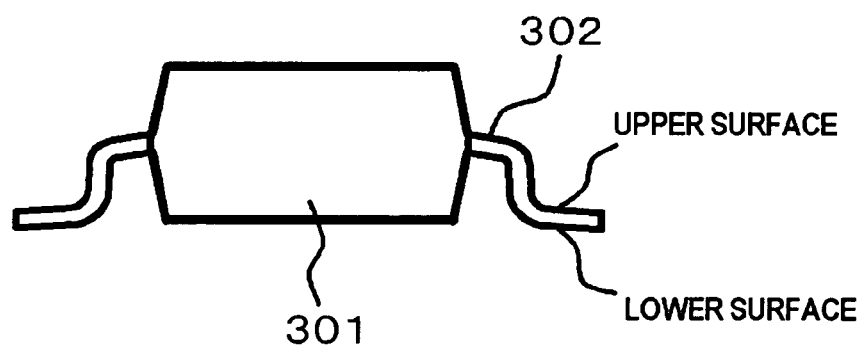

FIGS. 13A and 13B are schematic drawings illustrating an exemplary semiconductor device, wherein FIG. 13A is a plan view of a semiconductor device 300, and FIG. 13B is a sectional view taken along line A-A' in FIG. 13A.

A plurality of leads 302 are provided on the side faces of the encapsulation resin 301 having the semiconductor chip encapsulated therein. For example, the thickness of the lead 302 is 0.125 to 0.150 mm (millimeter), and the width is approximately 0.2 mm. The leads 302 are provided with a plated film on the upper and lower surfaces thereof (excluding the cut surface of the leads). In this configuration, the total thickness of the lead frame measured in the vertical direction is 0.125 to 0.180 mm or around, while taking the thickness of the plated film into account.

Figure 14A:
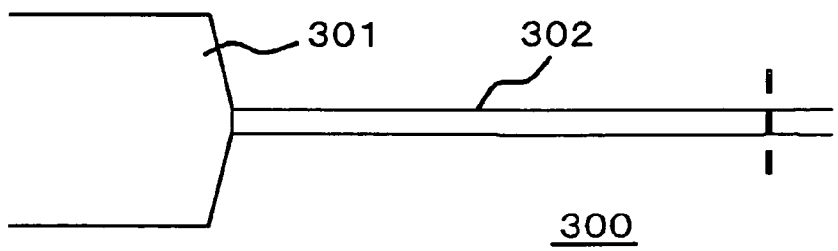
FIGS. 14A to 14C are drawings illustrating an exemplary forming process of lead.
Figure 14B:
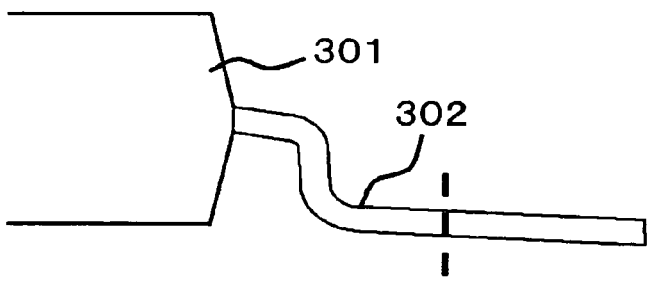
Figure 14C:
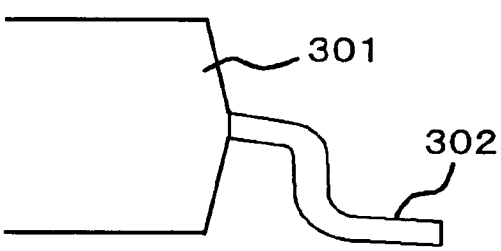
Figure 15A:
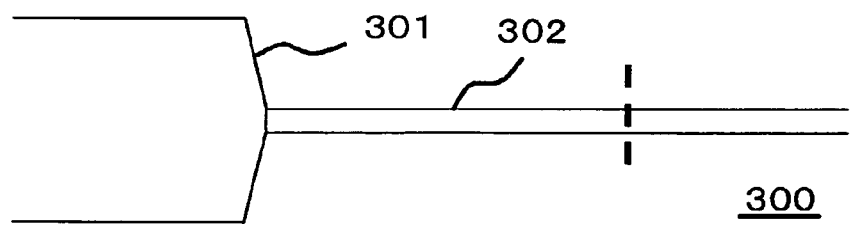
FIGS. 15A to 15C are drawings illustrating an another exemplary forming process of lead.
Figure 15B:
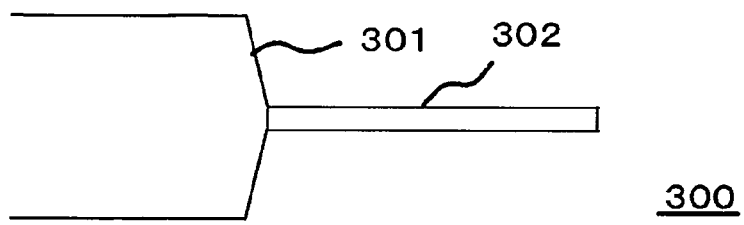
Figure 15C:
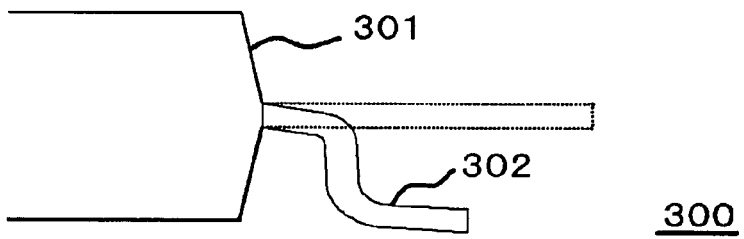

An exemplary process of forming the leads of the semiconductor device 300 is illustrated in FIGS. 14A to 14C. In this process, the leads 302 are once cut to have a length a little longer than finally required (FIG. 14A), bent into a predetermined geometry (FIG. 14B), and then cut to have a specified length (FIG. 14C). Another exemplary process of forming the leads of the semiconductor device is illustrated in FIGS. 15A to 15C. In this process, the leads 302 are cut to have a specified length (FIG. 15A, FIG. 15B), and then bent into a predetermined geometry (FIG. 15C).

Referring now back to FIG. 12, in the process of lead forming which involves cutting and bending of leads, it is important and indispensable to detect tilt of the individual die elements, in view of setting the clearance, determining positions of bending, and maintaining and managing the process accuracy. Each die element contains a parallel edge or a vertical edge. For example, the parallel edge 104 of the upper die 104, and the vertical edge 112a of the support 112 are indicated by broken lines. In the embodiments below, the tilt of each die element (simply referred to as "element", hereinafter) is detected by observing parallelism of the parallel edge of each constituent with respect to the placement surface of the cutting machine 100, or verticality of the vertical edge of each constituent with respect to the placement surface of the cutting machine 100.

First Embodiment

FIG. 1 is a schematic drawing illustrating procedures of detecting tilt of the cutting machine 100, as the object to be observed placed on a predetermined placement surface, with respect to the placement surface, in this embodiment.

In this embodiment, a tilt inspection apparatus 200 contains a light source 210 which irradiates light on the object to be observed; and a light shield plate 218 which has a first slit extended in a first direction and a second slit extended in a second direction normal to the first direction, and is disposed between the light source 210 and the object to be observed. The first slit and the second slit may be provided to form a cross pattern. FIG. 1 illustrates the first slit and the second slit as a cross slit 220.

Figure 2:
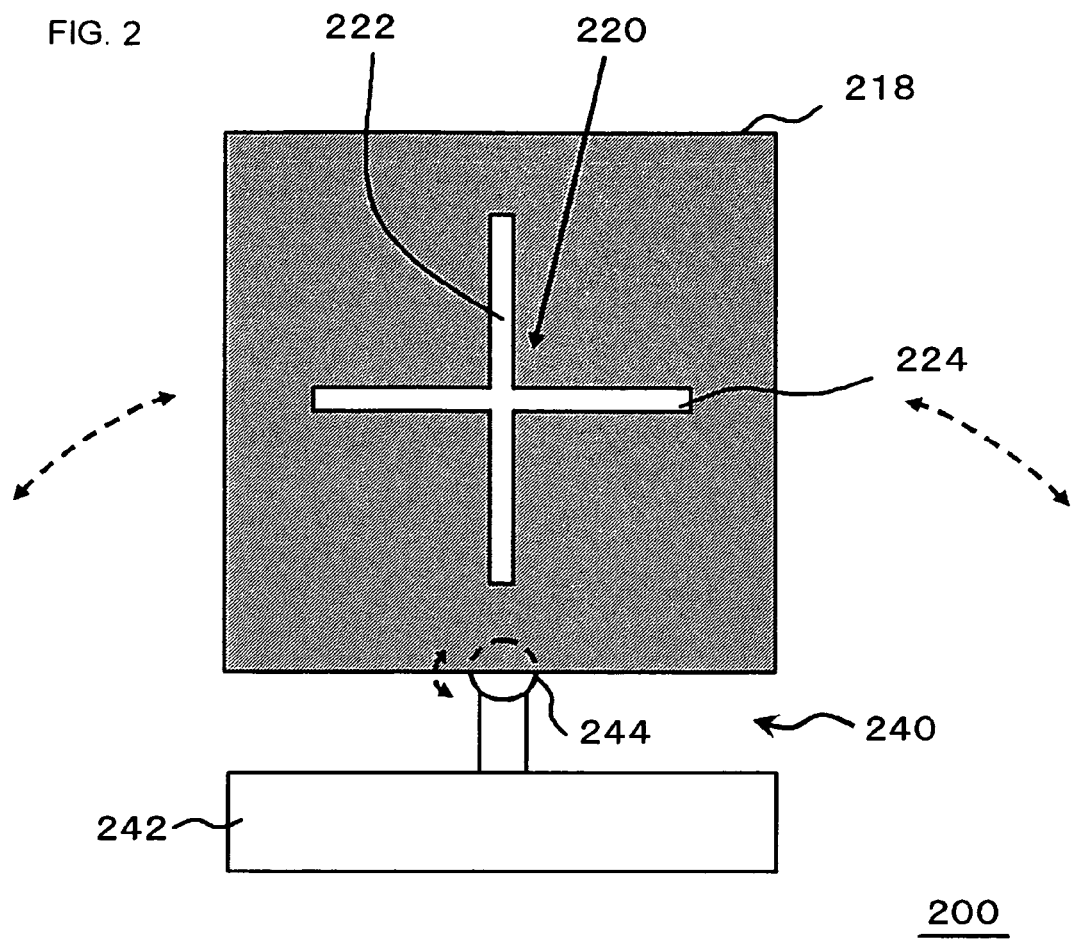
FIG. 2 is a front elevation illustrating a configuration of a light shield plate of a tilt inspection apparatus in one embodiment of the present invention.

FIG. 2 is a front elevation illustrating the light shield plate 218 of a tilt inspection apparatus 200 in this embodiment.

The tilt inspection apparatus 200 contains the light shield plate 218 having the cross slit 220 provided thereto, and a light shield plate carriage mechanism 240 (carriage mechanism). The light shield plate 218 is provided with the cross slit 220 which is composed of a first slit 222 extended in the first direction, and a second slit 224 extended in the second direction normal to the first direction. The first slit 222 and the second slit 224 of the cross slit 220 cross orthogonally to each other. Too large thickness of the light shield plate 218 relative to the width of the first slit 222 and the second slit 224 prevents light from passing therethrough when the light source 210 inclines. From this point of view, smaller thickness of the light shield plate 218 is more preferable. On the other hand, larger thickness of the light shield plate 218 is more preferable in view of ensuring a certain degree of strength. Taking both requirements into account, the thickness of the light shield plate 218 may be adjusted to 0.5 mm or around, for example.

The light shield plate carriage mechanism 240 contains a light shield plate supporting unit 242 and an axis of rotation 244. The light shield plate 218 is attached to a light shield plate supporting unit 242 so as to be mediated by the axis of rotation 244. The axis of rotation 244 rotates the light shield plate 218 in its in-plane direction, at an arbitrary angle or rotation with respect to the light shield plate supporting unit 242, and supports it so as to be fixed at the arbitrary angle.

In this embodiment, the light shield plate 218 is rotated and fixed so as to align the first slit 222 normal to the placement surface, and so as to align the second slit 224 in parallel to with the placement surface. Among the individual elements of the cutting machine 100, those having the vertical edges are irradiated with a first slit beam transmitted through the first slit 222, and the tilt of the elements is detected by visually comparing the vertical edges and the first slit beam to thereby confirm the parallelism therebetween. On the other hand, among the individual elements of the cutting machine 100, those having the parallel edges are irradiated with a second slit beam transmitted through the second slit 224, and the tilt of the elements is detected by visually comparing the parallel edges and the second slit beam to thereby confirm the parallelism therebetween.

In this embodiment, the light source 210 may be any of those visually observable, and may typically be LED (Light Emitting Diode).

According to the tilt inspection apparatus 200 in this embodiment, the tilt of the object to be observed may precisely be measured, when the object to be observed satisfies the conditions below:
  the surface irradiated by the slit beam may visually be observable from the outside thereof (mainly from the side faces);
  the irradiated slit beam may visually be observable on the irradiated surface;
  the surface irradiated by the slit beam is smooth; and
  the outer periphery of the surface irradiated by the slit beam is not chamfered (except those precisely chamfered by machining).

The angle of the light shield plate 218 may be adjusted and fixed by the procedures below:
  (1) the slit beams respectively transmitted through the first slit 222 and the second slit 224 are irradiated on the object to be observed; and
  (2) a jig for reference is disposed at an arbitrary position between the cross slit 220 and the object to be observed, and the angle of the light shield plate 218 is adjusted and fixed so as to align the first slit beam transmitted through the first slit 222 normal to the placement surface, or so as to align the slit beam transmitted through the second slit 224 in parallel with the placement surface, based on positional relation between the jig and the light irradiated on the jig.

The jig for reference herein may be any of those containing a parallel extended portion which extends in the parallel direction, the parallelism of which with respect to the placement surface being preliminarily guaranteed, or a vertically extended portion which extends in the vertical direction, the verticality of which with respect to the placement surface being preliminarily guaranteed. For an exemplary case where the jig contains the vertically extended portion, the angle of the light shield plate 218 may be adjusted and fixed so as to make the first slit beam which transmitted through the first slit 222 of the cross slit 220 fall on the vertically extended portion. For another exemplary case where the jig contains the parallel extended portion, the angle of the light shield plate 218 may be adjusted and fixed so as to make the second slit beam which transmitted through the second slit 224 of the cross slit 220 fall on the parallel extended portion. The jig may alternatively be configured to contain both of the parallel extended portion and the vertically extended portion. In this case, the angle of the light shield plate 218 may be adjusted and fixed so as to make the first slit beam which transmitted through the first slit 222 of the cross slit 220 fall on the vertically extended portion, and at the same time, so as to make the second slit beam which transmitted through the second slit 224 of the cross slit 220 fall on the parallel extended portion. In this way, the angle of the light shield plate 218 may precisely be adjusted and fixed. Still alternatively, by configuring the jig to contain both of the parallel extended portion and the vertically extended portion, and by adjusting and fixing the angle of light shield plate 218 so as to make the first slit beam which transmitted through the first slit 222 fall on the vertically extended portion, and so as to make the second slit beam which transmitted through the second slit 224 fall on the parallel extended portion, the angle of the light shield plate 218 may precisely be adjusted and fixed, even when the light source 210 is obliquely located in all directions with respect to the light shield plate 218.

When the parallelism of the placement surface with the horizontal plane is preliminarily guaranteed, the jig adoptable herein may be such as having a pendulum bob suspended from a string, and a supporting unit on which the string is hooked. In this case, the angle of the light shield plate 218 may be adjusted and fixed so as to make the first slit beam which transmitted through the first slit 222 of the cross slit 220 fall on the stationary string. The thickness, color, material and so forth of the string may be selectable from those allowing the observer to visually recognize state of overlapping of the string with the first slit beam which transmitted through the first slit 222.

FIG. 1 illustrates an exemplary case where four sets of the light source 210 and the cross slit 220 are respectively disposed in four directions around the cutting machine 100 as the object to be observed, meanwhile only a single set of the light source 210 and the cross slit 220 may be used for every measurement in the direction of every side face.

Figure 3:
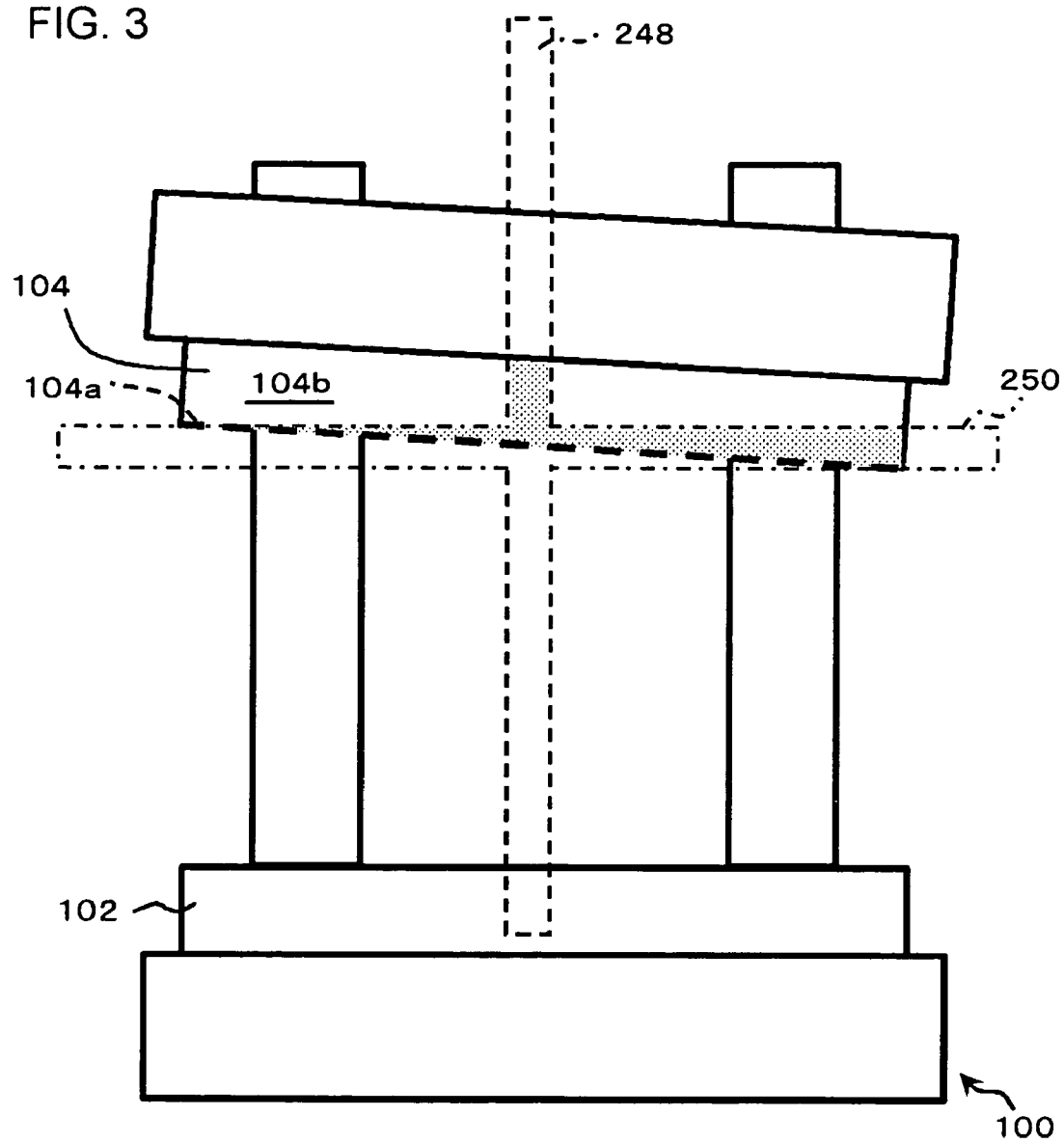
FIG. 3 is a drawing illustrating a state of slit beams transmitted through a cross slit of the light shield plate illustrated in FIG. 2 and irradiated on an upper die of a cutting machine.

FIG. 3 is a drawing illustrating a state of a first slit beam 248 and a second slit beam 250, respectively transmitted from the first slit 222 and the second slit 224 of the light shield plate 218 illustrated in FIG. 2, are irradiated on the upper die 104 of a cutting machine 100.

Illustrated herein is an exemplary case where the upper die 104 inclines. A parallel edge 104*a* of a surface to be observed 104*b* of the upper die 104 of the cutting machine 100 is now irradiated with second slit beam 250 which transmitted through the second slit 224. Since the parallel edge 104*a* herein is located at the lower end of the surface to be observed of the upper die 104, so that the light is preferably irradiated so as to make the lower end of the second slit beam 250 fall on the end portion of the parallel edge 104*a*. If the second slit beam 250 is found to unlimitedly extend without causing interception on the parallel edge 104a, it may be confirmed that the parallelism is ensured in this portion. In the drawing, an area of the surface to be observed 104b irradiated by the slit beam is indicated by hatching. In the exemplary case illustrated in the drawing, the second slit beam 250 irradiated on the parallel edge 104a of the upper die 104 causes interception on the upper die 104, so that it may be confirmed that parallelism of the upper die 104 is not ensured. In this embodiment, tilt of the upper die 104 may be detected by observing the parallelism between the second slit beam 250 and the parallel edge 104a of the upper die 104.

Accuracy of measurement of tilt of the object to be observed may be modified by adjusting the beam width of the slit beam irradiated on the object to be observed. For an exemplary case where the slit beam, adjusted to have a beam width of 100 μm, is irradiated on the object to be observed, any interception of the slit beam in midway of the target edge of the surface to be observed indicates that there is a tilt (difference in height) of 100 μm at that position. The beam width of the slit beam may be adjusted to a value equivalent to a minimum tilt (difference in height) desired to measure on the object to be observed.

Figure 4:
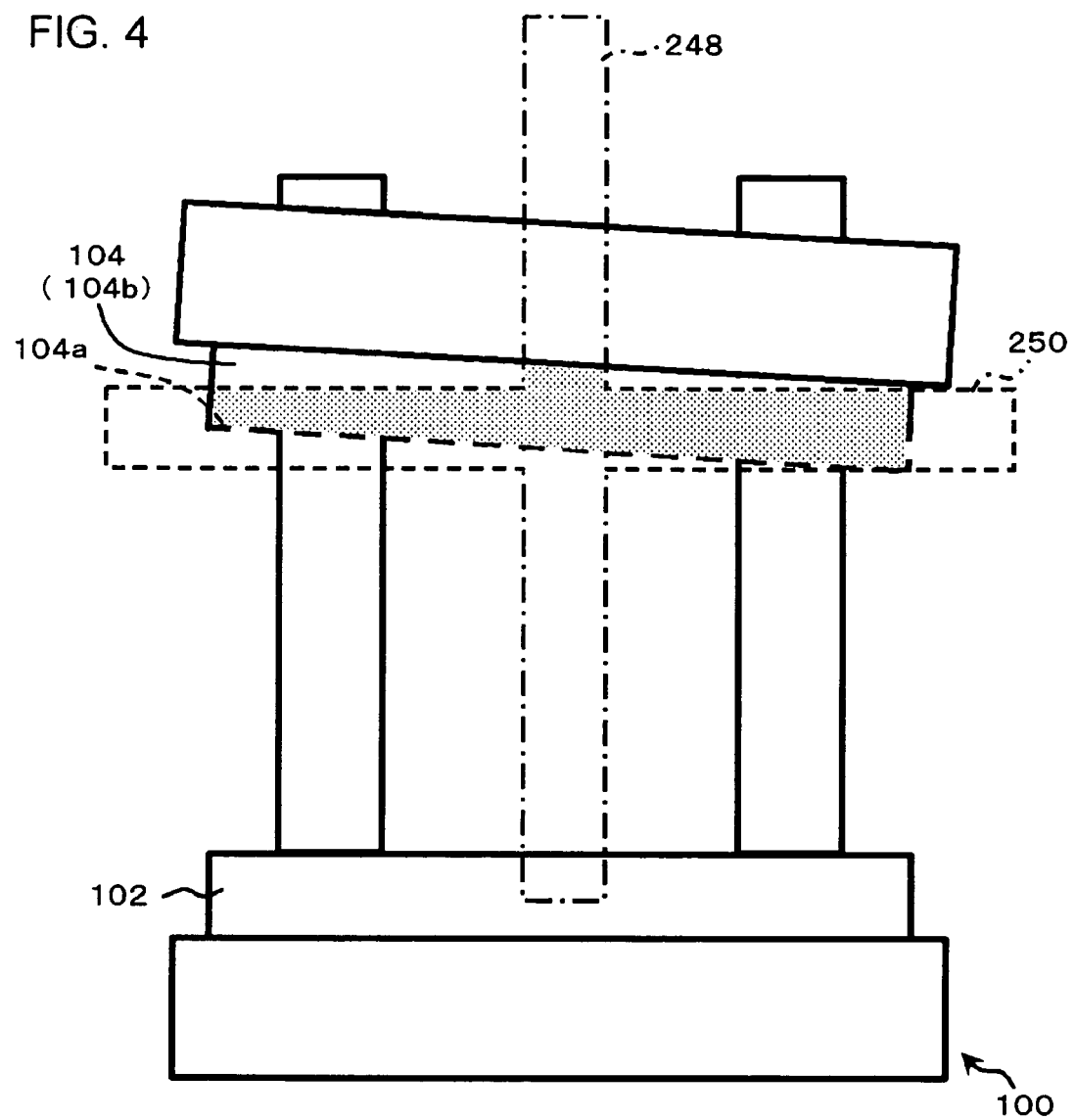
FIG. 4 is a drawing illustrating a case where the width of the slit beam is wider than that illustrated in FIG. 3.

FIG. 4 illustrates an exemplary case where the beam width of the slit beam is wider than that illustrated in FIG. 3.

Examples illustrated in FIG. 3 and FIG. 4 are same in the tilt of the upper die 104. A difference therebetween is that the second slit beam 250 in FIG. 3 causes interception on the upper die 104, whereas in FIG. 4, the second slit beam 250 does not cause interception on the upper die 104. In other words, the irradiated light having larger beam width is less likely to be intercepted, when compared under the same tilt. Accordingly, too large beam width of the slit beam may degrade the accuracy of measurement. For improved accuracy of measurement, narrower beam width of the slit beam is more preferable. The beam width of the slit beam may be modified, typically by adjusting the distance between the tilt inspection apparatus 200 and the object to be observed, or by adjusting the width of the first slit 222 and the second slit 224 of the light shield plate 218.

Figure 5:
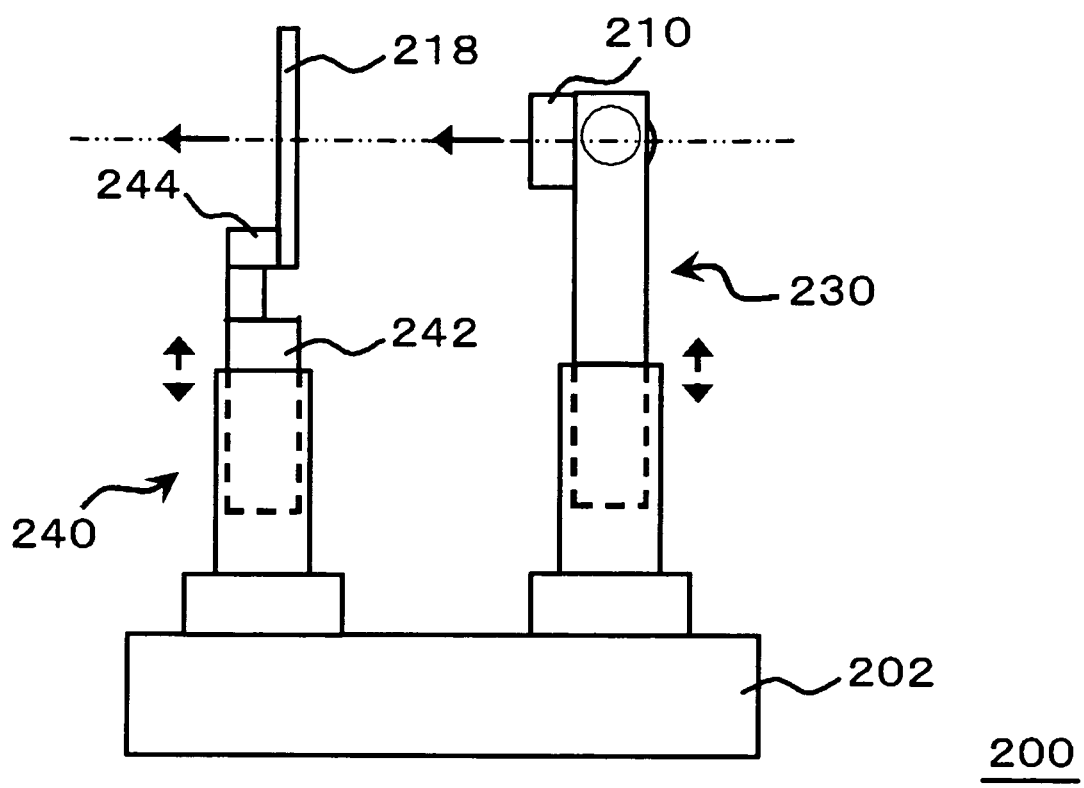
FIG. 5 is a side elevation illustrating an exemplary specific configuration of the tilt inspection apparatus.

FIG. 5 is a side elevation illustrating an exemplary specific configuration of the tilt inspection apparatus 200.

The tilt inspection apparatus 200 may further contain a light source carriage mechanism 230 which holds the light source 210 in a movable manner. The light source carriage mechanism 230 may contain a carriage mechanism which supports the light source 210 so as to be movable in the direction of leaving away from the placement surface and in the direction of coming closer to the placement surface, and a carriage mechanism which moves the light source 210 in the lateral direction with respect to the placement surface.

The light shield plate carriage mechanism 240 may contain, in addition to the above-described light shield plate supporting unit 242 and axis of rotation 244, a carriage mechanism which supports the light shield plate 218 so as to be movable in the direction of leaving away from the placement surface and in the direction of coming closer to the placement surface, and a carriage mechanism which moves the light shield plate 218 in the lateral direction with respect to the placement surface. By virtue of this configuration, position of irradiation with the slit beams may be changed, and thereby the individual elements of the object to be observed may continuously be observed. Although the light shield plate carriage mechanism 240 and the light source carriage mechanism 230 herein are independently illustrated, the tilt inspection apparatus 200 may alternatively be configured to have a carriage mechanism which moves the light shield plate 218 and the light source 210 while being linked to each other. One possible configuration may be such as attaching the light shield plate 218 to the light source 210, so as to allow motion of the light shield plate 218 while being linked with the light source 210.

Figure 6:
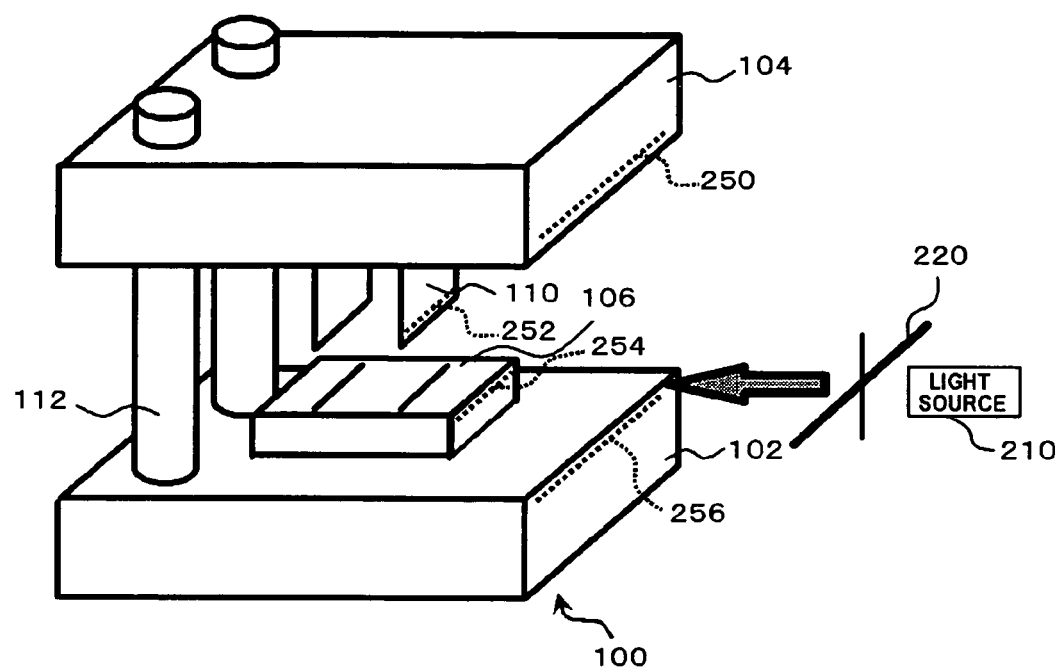
FIG. 6 is a drawing illustrating an exemplary measurement of parallelism of each element, using a second slit beam transmitted through a second slit of the cross slit.

FIG. 6 is a drawing illustrating an exemplary measurement of parallelism of each element, using the second slit beam transmitted through the second slit 224 of the cross slit 220. In the example illustrated in FIG. 6, the parallelism of the upper die 104, the cutting punch 110, the die 106, and the lower die 102 may be measured by the second slit beam 250, the second slit beam 252, the second slit beam 254, and the second slit beam 256, respectively. For the case where the parallelism of a plurality of elements is measured using the tilt inspection apparatus 200 as illustrated in FIG. 5 from one lateral side of the cutting machine 100, the parallelism of such plurality of elements may sequentially be measured, by fixing the angle of the light shield plate 218, and by adjusting the position of irradiation of the second slit beam.

Figure 7:
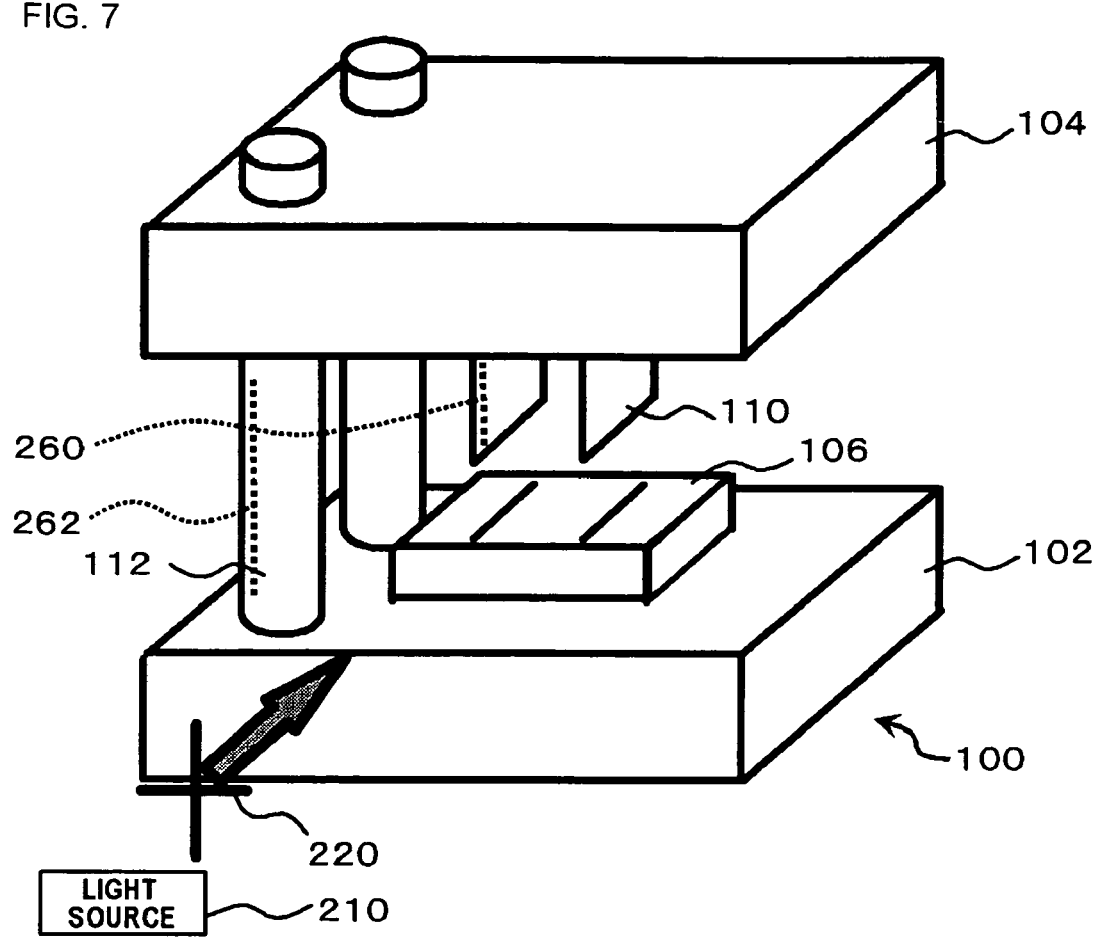
FIG. 7 is a drawing illustrating an exemplary measurement of verticality of each element, using a first slit beam transmitted through a first slit of the cross slit.

FIG. 7 is a drawing illustrating an exemplary measurement of verticality of each element, using a first slit beam transmitted through a first slit 222 of the cross slit 220. In the example illustrated in FIG. 7, the verticality of the cutting punch 110 and the support 112 may be measured by the first slit beam 260 and the first slit beam 262, respectively. For the case where the verticality of a plurality of elements is measured using the tilt inspection apparatus 200 as illustrated in FIG. 5 from one lateral side of the cutting machine 100, the verticality of such plurality of elements may sequentially be measured, by fixing the angle of the light shield plate 218, and by adjusting the position of irradiation of the first slit beam.

For the case where the light source 210 is moved together with the light shield plate 218, the angle of the light shield plate 218 may be adjusted and fixed for each time, using a reference jig. While exemplary cases of measuring the parallelism of the individual elements and the verticality of the individual elements are illustrated in FIGS. 6 and 7, respectively, the parallelism and the verticality may be measured continuously if the parallel edges and the vertical edges appear in the same lateral side, since the light shield plate 218 of this embodiment is provided with both of the first slit 222 and the second slit 224.

Figure 8A:
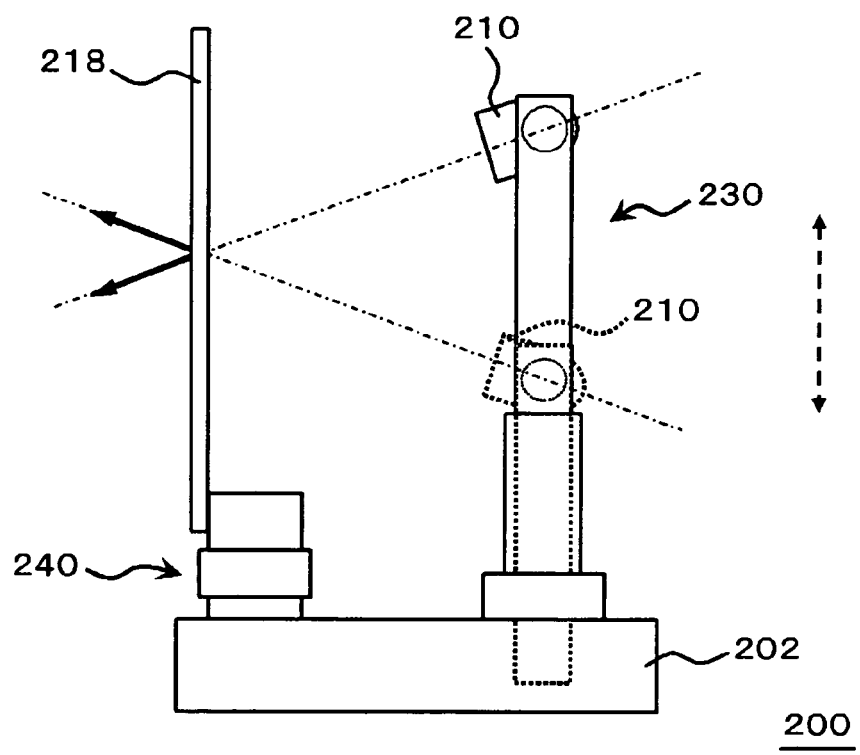
FIGS. 8A and 8B are drawings illustrating another exemplary specific configuration of the tilt inspection apparatus.
Figure 8B:
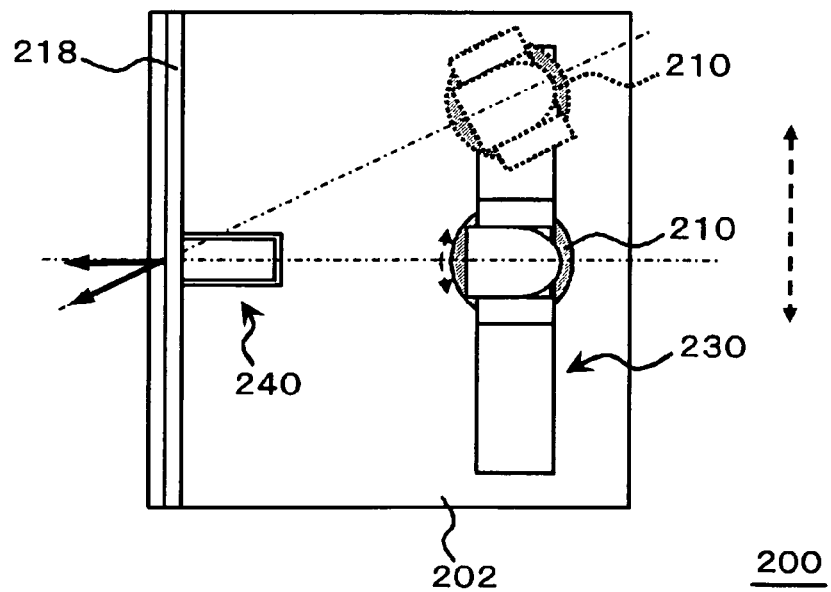

FIGS. 8A and 8B are drawings illustrating another exemplary specific configuration of the tilt inspection apparatus 200. FIG. 8A is a side elevation of the tilt inspection apparatus 200, and FIG. 8B is a plan view of the tilt inspection apparatus 200.

In this example, the light source carriage mechanism 230 may be configured to have also a mechanism of varying the angle of irradiation of light from the light source 210. In this case, the light shield plate carriage mechanism 240 may be configured also not to have a carriage mechanism for moving the light shield plate 218 in the vertical direction and the horizontal direction. Also in this case, for example, the tilt inspection apparatus 200 may be configured to irradiate the slit beam to a desired position of the cutting machine 100, by adjusting the angle of irradiation of light from the light source, or by moving the position of the light source 210, while fixing the light shield plate 218.

While the light shield plate carriage mechanism 240 and the light source carriage mechanism 230 were independently illustrated, the tilt inspection apparatus 200 may alternatively be configured to attach the light shield plate 218 to the light source 210, to thereby allow also the light shield plate 218 to move while being linked with the light source 210.

As has been described in the above, according to the configuration of the tilt inspection apparatus 200 of this embodiment, the edges of the surface to be observed of the individual elements of the object to be observed are irradiated by the first slit beam which is normal to the placement surface, or by the second slit beam which is in parallel with the placement surface, through the cross slit 220. Any sign of tilt of the individual elements, and degree of tilting (dimension) of the individual elements may precisely be confirmed, by visually observing the state of omission of the slit beam on the surface to be observed.

Conventionally, the parallelism and the verticality of precisely-machined components assembled by a plurality of components, particularly dies, have generally been calculated and judged based on measurement at a plurality of points using a point-contact-type measuring instrument, such as a dial gauge. The analysis was therefore complicated. Moreover, the conventional measurement and judgment of the parallelism and the verticality have required not only a measuring instrument, but also expertise in the measurement, and have needed a very expensive configuration containing a light source, a camera, image processor, specialized program, and so forth.

In contrast, according to the configuration of the tilt inspection apparatus 200 of this embodiment, tilt of the individual elements of the object to be observed may visually be observed. As a consequence, the measurement may be inexpensive and simple, while needing no expensive configuration containing the camera, the image processor, the specialized program, and so forth. Note that, also in this embodiment, detailed analysis or the like may be carried out using the camera and the image processor. For the case where the surface to be observed is analyzed in detail using the camera and the image processor, also a coherent light such as laser may be used as the light source 210.

Second Embodiment

Figure 9:
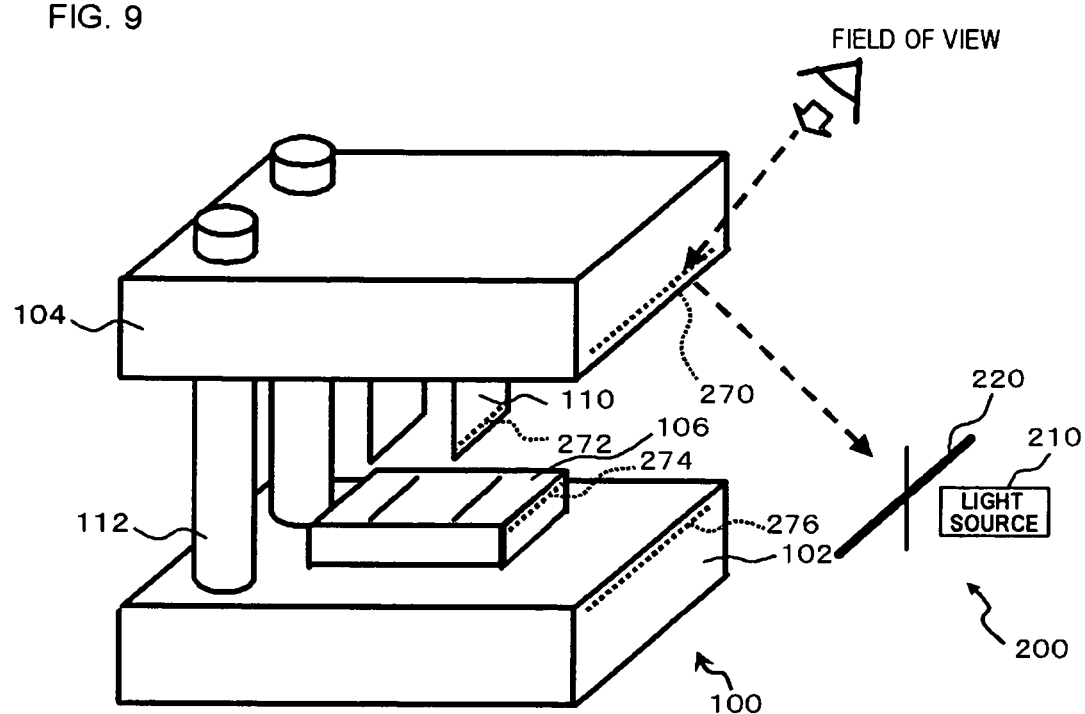
FIG. 9 is a drawing explaining a method of inspecting tilt using the tilt inspection apparatus according to one embodiment of the present invention.

FIG. 9 is a drawing explaining a method of inspecting tilt using the tilt inspection apparatus 200 according to this embodiment. This embodiment is different from the first embodiment, in that the slit beam is not irradiated on the cutting machine 100 which is the object to be observed, but instead an image of light shield plate is projected thereon.

Also in this embodiment, the tilt inspection apparatus 200 may be configured similarly to the configuration of the first embodiment. In this embodiment, however, the energy of light from the light source 210 of the tilt inspection apparatus 200 is set lower than that in the first embodiment. In this embodiment, the observer can detect the parallelism and the verticality of the object to be observed, by confirming the parallelism of the edges corresponded to the geometry of the first slit 222 or the second slit 224 seen in an image of the light shield plate 218 projected on the surface to be observed, with respect to the predetermined edge of the surface to be observed. In other words, the energy of light of the light source 210 in this embodiment may be reduced so that the slit beam does not appear on the surface to be observed. Also in this embodiment, the light source 210 may be selected from those visually observable.

According to the tilt inspection apparatus 200 of this embodiment, the tilt of the object to be observed may precisely be detected when the object to be observed satisfies the conditions below:

the surface on which an image of the light shield plate is projected may be observable from outside (mainly from lateral side) of the object to be observed;

the projected image of the light shield plate may visually be observable on the projection surface;

the surface on which the image of the light shield plate is projected is smooth (preferably as specular as possible); and the outer periphery of the surface on which the image of the light shield plate is projected is not chamfered (except those precisely chamfered by machining).

Figure 10:
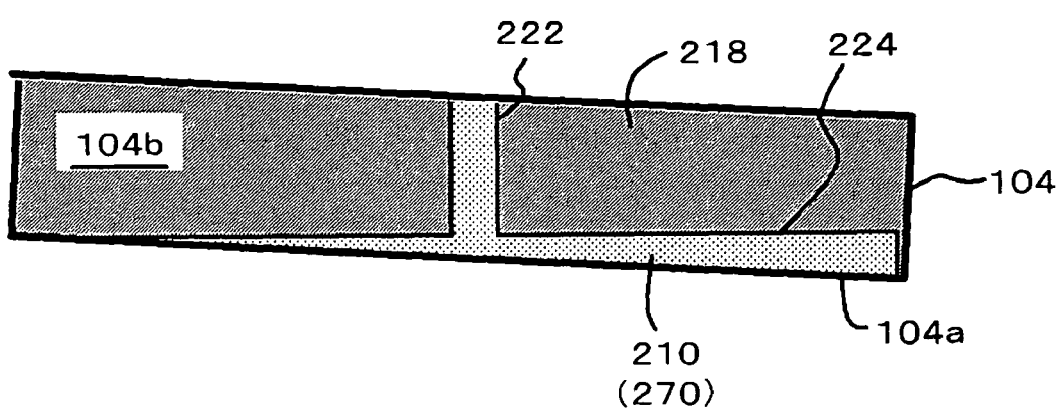
FIG. 10 is a drawing illustrating a state of a surface to be observed of an upper die of the cutting machine.

FIG. 10 is a drawing illustrating a state of a surface to be observed of an upper die 104 of the cutting machine 100.

On the surface to be observed 104b of the upper die 104, there is projected an image of the light shield plate 218 with a bright pattern 270 formed by light emitted from the light source 210 and transmitted through the first slit 222 and second slit 224. Now the field of view is adjusted so that a portion of the bright pattern 270 corresponded to the second slit 224 (light source 210) falls in the vicinity of the parallel edge 104a of the surface to be observed 104b of the upper die 104. If the bright pattern 270 extends in parallel with the edge of the element without being intercepted in midway, it may be confirmed that the parallelism of the element may be confirmed. In the illustrated example, tilt of the upper die 104 may be detected, based on the interception of the light source 210 (bright pattern 270).

In this embodiment, the accuracy of measurement of the object to be observed may be altered by adjusting the width of the bright pattern projected on the surface to be observed. For example, the width of the bright pattern may be thinned to as small as 10 μm or around. For an exemplary case where the light shield plate 218 is projected so as to give the width of the bright pattern of 10 μm on the object to be observed, any interception of the bright pattern observed on a target edge of the surface to be observed means that there is a tilt (difference in height) of 10 μm. The width of the bright pattern may be adjusted equivalent to a minimum dimension of tilt (difference in height) which is desired to be measured on the object to be observed. The width of the bright pattern may be varied, for example, by adjusting the distance between the tilt inspection apparatus 200 and the object to be observed, or by adjusting the width of the first slit 222 and the second slit 224 of the light shield plate 218.

Referring now back to FIG. 9, also the parallelism of the cutting punch 110, the die 106, and the lower die 102 may be observed using the bright patterns 272, 274 and 276 corresponded to the second slit.

Figure 11:
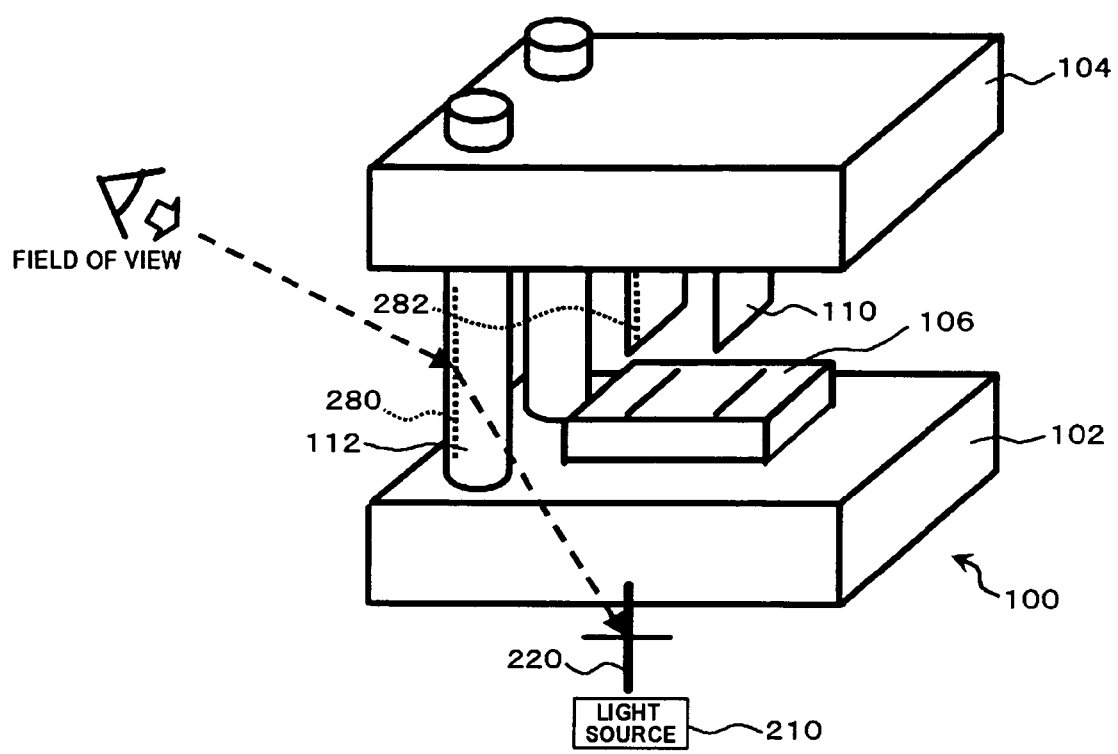
FIG. 11 is a drawing explaining a method of inspecting tilt using the tilt inspection apparatus according to another embodiment of the present invention.

FIG. 11 is a drawing explaining a method of inspecting the verticality of the individual elements using the tilt inspection apparatus 200 of this embodiment. Also the verticality of the support 112 and the cutting punch 110 may be observed based on the bright patterns 280 and corresponded to the first slit 222.

Also by this embodiment, effects similar to those in the first embodiment may be obtained. In the first embodiment, it is difficult to irradiate slit beam thinned to as small as the level of 10 μm due to broadening of the irradiated light. On the other hand, according to the configuration of this embodiment, the parallelism and the verticality of the individual elements may be confirmed by using the narrower bright pattern.

In addition, since the position of projection of the bright pattern in this embodiment may be altered by varying the position of viewing, so that the tilt inspection apparatus 200 may be configured without using the light source carriage mechanism 230 of the light source 210. Also a carriage mechanism of the light shield plate carriage mechanism 240 may be simplified. Moreover, the degree of freedom in position of installation of the tilt inspection apparatus 200 may be increased.

The embodiments of the present invention have been described in the above referring to the attached drawings, merely as examples of the present invention, without being precluded from adoption of any other various configurations.

The above-described modes of irradiation are such as adopting a single first slit 222 and a single second slit 224 configured to form a cross, meanwhile a plurality of slits may alternatively be formed in the light shield plate 218 both in the horizontal and vertical directions. Still alternatively, the slit may have a lattice form. In this configuration, the individual slits in the horizontal direction and the individual slits in the vertical direction are preferably arranged at a pitch sufficient for avoiding overlapping of every adjacent slit beams (or bright patterns) on the irradiation surface or on the projection surface when visually observed.

For the case where a plurality of slits are formed respectively in the horizontal direction and in the vertical direction, the individual slits may have different widths. By virtue of this configuration, measurement based on a plurality of slit beams (or bright patterns) different in width may continuously be carried out, so as to precisely understand the tilt.

It may still also be allowable to combine the method of irradiating the slit beam described in the first embodiment and the method of projecting the bright pattern described in the second embodiment. For an exemplary case where the tilt is small and is therefore difficult to be observed by the method of irradiating the slit beam, observation may be continued by reducing the energy of light from the light source 210 so as to project the bright pattern, and thereby the tilt may precisely be measured.

Although the embodiments in the above have described the methods of inspecting the tilt of the completed dies, the present invention is adoptable also to inspection of the individual die elements in the process of assembly of the dies.

It is apparent that the present invention is not limited to the above embodiments, that may be modified and changed without departing from the scope and spirit of the invention.

What is claimed is:

1. A tilt inspection apparatus which detects tilt of an object to be observed with respect to a placement surface on which said object is placed, comprising:
   a light source which irradiates light or projects an image onto said object to be observed;
   a light shield plate which has a first slit extended in a first direction and a second slit extended in a second direction normal to said first direction, and is disposed between said light source and said object to be observed; and
   a carriage mechanism which supports said light shield plate so as to be rotatable in the in-plane direction of said light shield plate, and fixes said light shield plate while aligning said first slit normal to said placement surface.

2. The tilt inspection apparatus as claimed in claim 1,
   wherein said carriage mechanism supports said light shield plate so as to be movable in the direction of leaving away from said placement surface and in the direction of coming closer to said placement surface.

3. The tilt inspection apparatus as claimed in claim 1,
   wherein said carriage mechanism supports said light shield plate so as to be movable in the lateral direction over said placement surface.

4. The tilt inspection apparatus as claimed in claim 2,
   wherein said carriage mechanism supports said light shield plate so as to be movable in the lateral direction over said placement surface.

5. The tilt inspection apparatus as claimed in claim 1,
   wherein said carriage mechanism supports said light source so as to be changeable in the angle of irradiation of light or angle of projection of image relative to said object to be observed.

6. The tilt inspection apparatus as claimed in claim 1,
   wherein said carriage mechanism supports said light source so as to be movable while being linked with said light shield plate.

7. The tilt inspection apparatus as claimed in claim 1,
   wherein said first slit and said second slit are provided to form a cross pattern.

8. A method of inspecting tilt of an object to be observed, using the tilt inspection apparatus described in claim 1, by comparing a slit beam emitted from said light source and transmitted through said first slit or said second slit, or an projected blight pattern corresponded to said first slit or said second slit, with an edge of a predetermined surface composing said object to be observed.

9. The method of inspecting tilt as claimed in claim 8,
   wherein the tilt of said object to be observed is detected by observing parallelism between said slit beam and said edge.

10. The method of inspecting tilt as claimed in claim 8,
    wherein the tilt of said object to be observed is detected by irradiating said slit beam on said edge of said predetermined surface, and by observing parallelism of said irradiated slit beam with respect to said edge.

11. The method of inspecting tilt as claimed in claim 8,
    wherein the tilt of said object to be observed is detected by projecting an image of said light shield plate on said edge of said predetermined surface, and by observing parallelism of said projected blight pattern with respect to said edge.

12. A method of inspecting tilt of an object to be observed with respect to a placement surface on which said object is placed, by disposing a light shield plate, which has a first slit extended in a first direction normal to said placement surface and a second slit extended in a second direction normal to said first direction, between said object to be observed and a light source; and by comparing a slit beam transmitted through said first slit or said second slit, or an projected blight pattern corresponded to said first slit or said second slit, with an edge of a predetermined surface composing said object to be observed.

13. The method of inspecting tilt as claimed in claim 12,
    wherein the tilt of said object to be observed is detected by observing parallelism between said slit beam and said edge.

14. The method of inspecting tilt as claimed in claim 12,
    wherein the tilt of said object to be observed is detected by irradiating said slit beam on said edge of said predetermined surface, and by observing parallelism of said irradiated slit beam with respect to said edge.

15. The method of inspecting tilt as claimed in claim 12,
    wherein the tilt of said object to be observed is detected by projecting an image of said light shield plate on said edge of said predetermined surface, and by observing parallelism of said projected blight pattern with respect to said edge.

* * * * *